US009406172B2

(12) United States Patent  
Selvarajan

(10) Patent No.: US 9,406,172 B2  
(45) Date of Patent: Aug. 2, 2016

(54) METHOD FOR AUTOMATIC EXTRAPOLATION OF DESIGNS ACROSS APPAREL AND ACCESSORY SIZES AND TYPES

(71) Applicant: Balamurugan Selvarajan, Bangalore (IN)

(72) Inventor: Balamurugan Selvarajan, Bangalore (IN)

(73) Assignee: v Personalize Inc., San Francisco, CA (US)

( * ) Notice: Subject to any disclaimer, the term of this patent is extended or adjusted under 35 U.S.C. 154(b) by 106 days.

(21) Appl. No.: 14/283,869

(22) Filed: May 21, 2014

(65) Prior Publication Data

US 2015/0339800 A1   Nov. 26, 2015

(51) Int. Cl.
| | |
|---|---|
| *G06F 19/00* | (2011.01) |
| *G06T 19/20* | (2011.01) |
| *A41H 3/00* | (2006.01) |
| *G06T 3/40* | (2006.01) |

(52) U.S. Cl.
CPC *G06T 19/20* (2013.01); *A41H 3/00* (2013.01); *A41H 3/007* (2013.01); *G06T 3/40* (2013.01)

(58) Field of Classification Search
CPC ........ G06T 3/0006; A41H 3/007; D05C 5/00; D05C 5/02
USPC .................................................. 700/130–132
See application file for complete search history.

(56) References Cited

U.S. PATENT DOCUMENTS

| | | | | | |
|---|---|---|---|---|---|
| 4,916,624 | A * | 4/1990 | Collins | .................. | A41H 3/007 700/132 |
| 4,916,634 | A * | 4/1990 | Collins | .................. | A41H 3/007 700/132 |
| 4,926,344 | A * | 5/1990 | Collins | .................. | A41H 3/007 700/132 |
| 5,557,527 | A * | 9/1996 | Kotaki | .................. | D04B 15/66 66/232 |
| 5,719,777 | A * | 2/1998 | Kotaki | .................. | D04B 37/02 66/75.2 |
| 5,754,431 | A * | 5/1998 | Kotaki | .................. | D04B 1/246 700/131 |
| 5,757,661 | A * | 5/1998 | Surville | .............. | G06Q 10/043 700/131 |
| 6,473,671 | B1 * | 10/2002 | Yan | ........................ | A41H 3/007 700/134 |
| 7,657,340 | B2 * | 2/2010 | Lind | ...................... | A41H 3/007 345/419 |
| 8,731,703 | B1 * | 5/2014 | Lehrer | .................. | G06F 3/1257 700/132 |
| 8,838,482 | B2 * | 9/2014 | Schindler | ............... | G06Q 10/06 700/131 |
| 2001/0026272 | A1 * | 10/2001 | Feld | ........................ | A41H 3/007 345/419 |
| 2004/0049309 | A1 * | 3/2004 | Gardner | ................... | A41H 1/00 700/132 |
| 2005/0289018 | A1 * | 12/2005 | Sullivan | ................. | G06Q 30/00 705/26.5 |
| 2009/0222127 | A1 * | 9/2009 | Lind | .................. | G06Q 30/0601 700/132 |
| 2011/0298897 | A1 * | 12/2011 | Sareen | ................... | G06N 3/006 348/47 |

* cited by examiner

*Primary Examiner* — Nathan Durham

(57) ABSTRACT

A method for modifying the dimensions of a design pattern embedded on a garment is disclosed. Original dimensions of the apparel and new dimensions according to which the apparel is to be modified are determined. A coordinate pair indicating the center point of the design pattern is determined. Two delta factors, one corresponding to height and the other corresponding to the width are determined. The delta factors indicate the difference, in terms of height and width respectively, between the original dimensions of the garment, and the dimensions to which the garment is purported to be modified. Subsequently, one of the delta factors is selected depending upon the nature of modification, and provided as an input to an affine transformation operation, along with the coordinate pair. The dimensions of the design pattern are modified based on the affine transformation operation and the selected delta factor and coordinate pair.

3 Claims, 2 Drawing Sheets

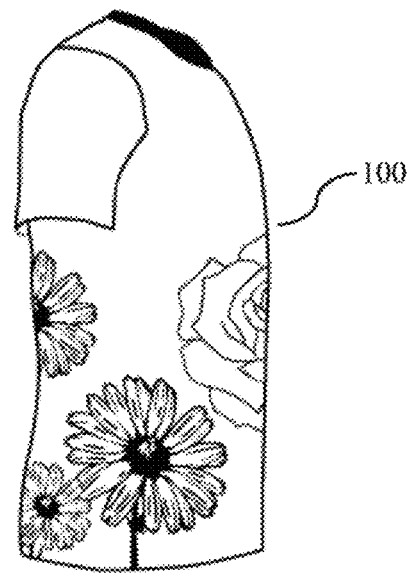
FIG.1
Prior Art
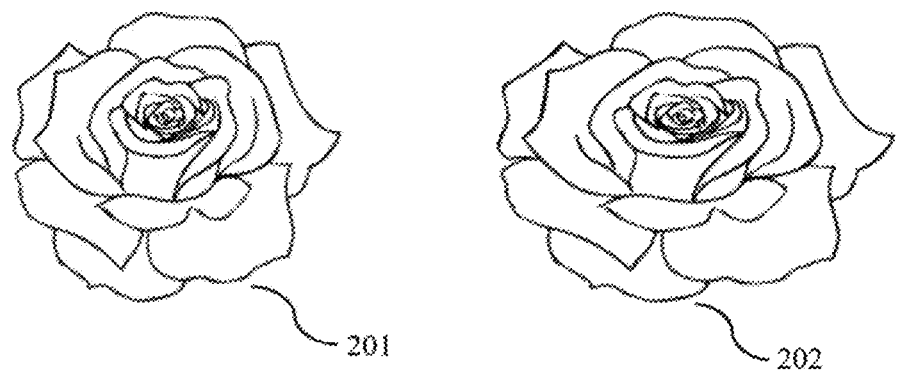
FIG.2A
Prior Art
FIG.2B
Prior Art

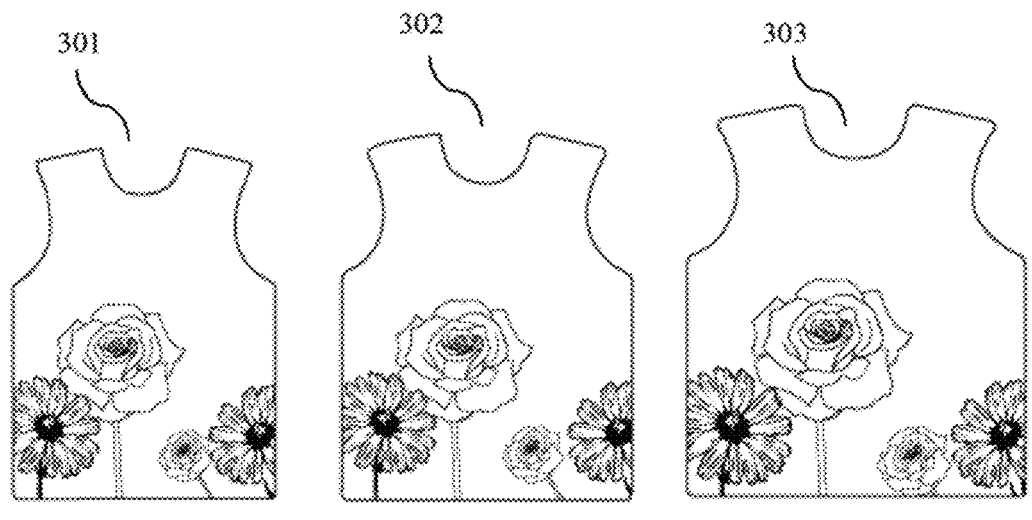

METHOD FOR AUTOMATIC EXTRAPOLATION OF DESIGNS ACROSS APPAREL AND ACCESSORY SIZES AND TYPES

BACKGROUND

1. Technical Field

The present invention relates to the automation of design extrapolation across apparel pattern pieces, wherein a design made for a pattern set at a particular size (example: Man's Size M, T-shirt) is extrapolated to other sizes of the same pattern set (example: size XS, L, XL) or to pattern sets of a different product (Example: Size M of Woman's T or to a Backpack).

2. Description of Related Art

The concept of creating custom designs on apparel has been around for a long time. As is well known in this field, the actual size of the apparel can vary widely from one size to another (a Men's T-shirt, for example, varies by as much as 16 inches in width from XS to 2XL). This is not a problem if the design is only on the front or the back—one can just leave the additional area blank, but is a problem when the design spans seams (full-bleed designs). To make matters more complex, most apparel grow much more horizontally, than vertically across sizes and scye curvature also varies with size. For example, from XS to 2XL, the width may increase by as much as 16 inches, but the height only by 4 inches.

Therefore, a direct scaling of image will cause it to lose aspect ratio and make the image look "squished" and in cases get parts of the design, image or texts cut-off, necessitating the designers or consumers to design individually for each size they need, in what is today, a largely manual process.

SUMMARY OF THE INVENTION

The present invention outlines a method for completely automating the extrapolation of designs across patterns, wherein a design made for a pattern set at a particular size (example: Man's Size M, T-shirt) is extrapolated to other sizes of the same pattern set (example: size XS, L, XL) or to pattern sets of a different product (Example: Size M of Woman's T or to a Backpack)

BRIEF DESCRIPTION OF THE DRAWINGS

FIG. 1: An example of a prior art full-bleed design;
FIG. 2: A prior art design that has been directly scaled; and
FIG. 3: A design made on size M and an automatically extrapolated to other sizes using the method described in this invention.

DETAILED DESCRIPTION

The concept of creating custom designs and prints on apparel is as old as human creativity. However, with mass manufacturing and desire for coordinated designs, a designer or consumer is forced to create a custom design for each size of the apparel they desire.

This is due to the fact the actual size of the apparel can vary widely from one size to another. This is not a problem if the design is only on the front or the back—one can just leave the additional area blank, but is a problem when the design spans seams (full-bleed designs). Reference numeral 100 of FIG. 1 illustrates an example of a design that spans seams.

To make matters more complex, most apparel grow much more horizontally, than vertically across sizes and curvature also varies with size. For example, from XS to 2XL, the width may increase by as much as 16 inches, but the height may only increase by 4 inches.

Therefore, as direct scaling of image will cause it to lose aspect ratio and make the image look "squished" and unnatural, making it necessary for the designer or consumer to design individually for each size. Reference numerals 201 and 202 of FIG. 2 illustrates a design that has been directly scaled. Notice how the image depicted by reference numeral 202 loses its aspect ratio and looks "squished" in comparison to the image identified by reference numeral 201.

However, due to the way we perceive images, certain transformations to images will not be readily apparent to the human vision. This invention makes use of this and other heuristics to outline a method for solving this problem and completely automating the extrapolation of designs from one size to another and from one product to another, without losing the essence of the original design!

In one embodiment of this invention, the design made for a pattern set at a particular size (example: Man's Size M, T-shirt) is extrapolated to another sizes of the same pattern set (example: size XS, L or XL), using the formula:

$$[Sx=\max(dX, dY), Sy=\max(dX, dY), Tx=cX, Ty=cY]$$
when scaling up

AND $$[Sx=\min(dX, dY), Sy=\min(dX, dY), Tx=cX, Ty=cY]$$
when scaling down

And then cut the new patterns,
In the above formula:
dX=delta X (difference in X as %) between the two pattern sizes and
dY=delta Y (difference in Y as %) between the two pattern sizes and
cX & cY are the "adjust to center" translations for the original image Notice how the Sx and Sy are kept the same to preserve aspect ration, but other adjustments are made to cover the new pattern size and also retain the original design.

In another embodiment of the invention, wherein, dY>dX and dY−dX<=10% or dX>dY and dX−dY<=5%, we can take advantage of the difference in human perception of horizontal and vertical scaling and use the formula:

$$[Sx=dX, Sy=dY, Tx=cX, Ty=cY]$$

In another embodiment, and the best method of extrapolation, each element in the original design (layer, images, text, etc instead of the final composite) are individually modified as follows:

Translate each element's (Tx, Ty) to (Tx*dX+cX, Ty*dY+cY) and
Scale all elements by max (dX, dY) or min (dX, dY) and adjust to center As a special case, wherein the design consists only of colors and regular patterns like stripes and plaids, the first finished pattern itself can be directly scaled to [Sx=dX, Sy=dY].

As yet another special case, wherein, the full background image has a ratio of image size to pattern size of greater than 20%, no scaling or translation is required.

To extrapolate an image across products (example: Man's Size M, T-shirt) to the pattern sets of a different product (example: Woman's Size XL T-shirt or to a Backpack), the above formula has to be adjusted as follows:

$$dX=dX*pX$$

and $$dY=dY*pY$$

where (pX, pY) are the X and Y ratio between the pattern sizes of the two products we are translating between.

FIG. 3 illustrates the design made on Size M (denoted by reference numeral 302), automatically extrapolated to other sizes of the pattern set, namely Size 'S' (301) and Size 'XL' (303) using the method described above.

What is claimed is:

1. A computer implemented method for modifying dimensions of a garment having at least one design pattern embedded thereupon, said method comprising the following computer implemented steps:

determining original height and original width of the garment;

determining a second height and a second width, said second height and second width indicative of a modified dimension of the garment;

determining a coordinate pair indicative of a center point of the design pattern embedded on the garment;

calculating a first delta factor, said first delta factor being a value corresponding to a difference between the original width and the second width;

calculating a second delta factor, said second delta factor being a value corresponding to a difference between the original height and the second height;

determining a maximum value and a minimum value based on a comparison of the value of said first delta factor with the value of said second delta factor;

applying an affine transformation operation on the original height and original width of the garment, and providing said coordinate pair and at least one of said maximum value and said minimum value as inputs to said affine transformation operation; and modifying the original height and original width of the garment in accordance with at least one of said maximum value and minimum value, and selectively adjusting said coordinate pair on modified height and modified width of the garment, using said affine transformation operation.

2. The method as claimed in claim 1, wherein the step of modifying the original height and original width of the garment further includes the step of selectively extrapolating the original height and original width of the garment using said affine transformation operation, and in accordance with said maximum value.

3. The method as claimed in claim 1, wherein the step of modifying the original height and original width of the garment further includes the step of selectively reducing the original height and original width of the garment using said affine transformation operation, and in accordance with said minimum value.

* * * * *